(12) United States Patent
Lazar

(10) Patent No.: US 11,950,588 B2
(45) Date of Patent: Apr. 9, 2024

(54) TACTICAL TARGETING AND WILDLIFE MITIGATION INFLATION DEVICE AND METHODS OF USE

(71) Applicant: Adam North Lazar, Katonah, NY (US)

(72) Inventor: Adam North Lazar, Katonah, NY (US)

(*) Notice: Subject to any disclaimer, the term of this patent is extended or adjusted under 35 U.S.C. 154(b) by 30 days.

(21) Appl. No.: 17/646,220

(22) Filed: Dec. 28, 2021

(65) Prior Publication Data
US 2023/0200372 A1    Jun. 29, 2023

(51) Int. Cl.
| A01M 29/06 | (2011.01) |
| A01M 29/16 | (2011.01) |
| F41J 9/02  | (2006.01) |
| F41J 5/24  | (2006.01) |

(52) U.S. Cl.
CPC ............ *A01M 29/06* (2013.01); *A01M 29/16* (2013.01); *F41J 9/02* (2013.01); *F41J 5/24* (2013.01)

(58) Field of Classification Search
CPC . A01M 29/06; A01M 29/16; F41J 9/02; F41J 5/24
USPC ........................................................ 340/500
See application file for complete search history.

(56) References Cited

U.S. PATENT DOCUMENTS

| 3,128,096 A * | 4/1964 | Hammond | ................. F41J 9/02 273/386 |
| 10,088,280 B2 | 10/2018 | McFadyen | |
| 10,278,379 B2 | 5/2019 | Holt et al. | |
| 10,362,778 B2 | 7/2019 | O'Shea | |
| 2006/0072347 A1* | 4/2006 | Ferraro | ................. F04D 29/601 362/808 |
| 2009/0025652 A1 | 1/2009 | Jong | |
| 2012/0324755 A1* | 12/2012 | Zhao | ..................... A45D 20/12 34/239 |
| 2013/0123997 A1* | 5/2013 | King | ........................ H02H 3/46 700/292 |
| 2013/0123998 A1* | 5/2013 | King | ................. H02J 13/00006 700/292 |
| 2014/0086646 A1* | 3/2014 | Okuno | ............... G03G 15/2028 399/323 |

(Continued)

FOREIGN PATENT DOCUMENTS

| CN | 108955399 A | 12/2018 |
| CN | 211064817 U | 7/2020 |

(Continued)

*Primary Examiner* — Kerri L McNally
*Assistant Examiner* — Thang D Tran
(74) *Attorney, Agent, or Firm* — Simpson & Simpson, PLLC

(57) ABSTRACT

The present invention generally relates to an inflation device having a base with a top surface containing an aperture and a control device, a motor having a shaft mounted within the base and controlled by the control device, a propeller fixedly secured to the motor to produce an upward thrust, an inflation member secured to the base, circumscribing the aperture, and arranged for inflation by the upward thrust of the propeller, a plurality of wireless motion sensors spaced in the vicinity of the base to detect the presence of movement and to communicate with the control device to initiate inflation of the inflation member, and a random time generator to control random inflation of the inflation member. A method of using the inflation device is also provided in both a tactical training and a wildlife mitigation setting.

18 Claims, 15 Drawing Sheets

(56) References Cited

U.S. PATENT DOCUMENTS

| | | | | |
|---|---|---|---|---|
| 2015/0049592 | A1* | 2/2015 | Braswell | G04G 11/00 |
| | | | | 368/250 |
| 2017/0097662 | A1* | 4/2017 | Chan | G09F 19/008 |
| 2017/0146324 | A1* | 5/2017 | Mcfadyen | F41J 5/18 |
| 2018/0077921 | A1* | 3/2018 | O'Shea | A01M 31/002 |
| 2018/0213768 | A1* | 8/2018 | Holt | A01M 29/06 |
| 2019/0246623 | A1 | 8/2019 | Tews et al. | |
| 2019/0321252 | A1* | 10/2019 | Newton | A61B 5/4836 |
| 2023/0063979 | A1* | 3/2023 | Doffing | F04D 25/084 |

FOREIGN PATENT DOCUMENTS

| | | | |
|---|---|---|---|
| GB | 2492376 | A | 1/2013 |
| JP | 2004125224 | A | 4/2004 |
| JP | 2005258444 | A | 9/2005 |
| JP | 3160320 | U | 6/2010 |
| KR | 20010088674 | A | 9/2001 |
| KR | 101752609 | B1 | 6/2017 |

\* cited by examiner

TACTICAL TARGETING AND WILDLIFE MITIGATION INFLATION DEVICE AND METHODS OF USE

FIELD

The present invention relates to an inflation device used in a tactical training or a wildlife mitigation setting.

COMPUTER PROGRAM LISTING APPENDIX

The present application includes a computer program listing appendix. The computer program listing is intended to comprise a part of the complete written description of the invention pursuant to 35 U.S.C. § 112. The appendix contains ASCII text files of the computer program as follows:

| Name | Date Created | Size |
| --- | --- | --- |
| Arduino_code.txt | 12/20/21 12:10 PM | 3 KB |
| Arduino_code_Alt1.txt | 12/20/21 12:08 PM | 4 KB |
| Arduino_code_Alt2.txt | 12/20/21 12:07 PM | 4 KB |
| Arduino_code-setup.txt | 12/20/21 12:10 PM | 2 KB |

BACKGROUND

Combat training, also known as tactical training, is an important tool used to prepare and train military forces, police departments, and civilians on how to react to live-fire situations. Tactical training often combines technical and drill training and focuses on training personnel with organization, weaponry, and tactical resources in different types of battle. To make the training most valuable, conditions must be met to mock a situation of a high-intensity shooting so that those training can have a more authentic approach when confronting an armed attack. It is important for those training to be hyperaware of their surroundings and overcome the side effects that come with the adrenaline rush responses to live-fire situations such as a raising heartbeat and shaking hands.

Most affordable tactical training setups involve stationary targets set up in a field, training room, or in a course staged to resemble a real-life scenario where an active shooter may be present such as a school, multi-level building, office, etc. The targets are often paper or cardboard that display a silhouette of a person. As the user moves through the course, they shoot rounds at the stationary paper targets. Often, even after shooting the target, it remains standing upright, which can cause uncertainty to the trainee about whether the target was accurately shot. Additionally, because of the limitations of the placement of stationary targets, those who repeat the training course multiple times can often predict where the targets are placed, and thus, do not have a realistic response when spotting and shooting at the targets. Overall, a major problem with stationary paper silhouette targets is that they do not accurately mimic a realistic shooting scenario where targets are constantly moving and hiding and thus, this style of training causes situational conditioning.

A problem with stationary paper silhouettes targets is that they do not accurately mimic a realistic shooting scenario in order to train those in combat and civilians most effectively. Alternative solutions to training with a stationary target are team combat training or virtual reality training. In team combat training, groups split up into teams and train against each other. To prevent injury, typically Simunition® or Airsoft® brand guns are used instead of live rounds. Though team combat training more closely resembles a realistic scenario, it is limited to the requirement of a group of personnel willing to participate, and thus, is not suitable for individual training. Alternatively, virtual reality training also provides a more realistic setting. However, personnel are unable to shoot at live targets, and there is the possibility of glitching which would interfere with the effectiveness of the training. A major limitation to both of these solutions is that they are costly, require a lot of equipment, and have strict guidelines, which prevents large-scale use.

An inflatable device programmed to move rapidly and randomly can also aid in wildlife mitigation measures to prevent property damage, crop consumption, and waste production of wildlife in various outdoor areas because rapid and random movement will prevent situational conditioning of wildlife.

Farm fields, lawns, docks, shorelines, etc., are vulnerable to property damage, crop consumption, and waste production from wildlife, such as birds, rats, mice, squirrels, raccoons, groundhogs, beaver, deer, coyotes, etc. These animals often come to an area in search of food which can cause a variety of damage to fields of crops, grass, and plants. Some animals come to an area in search of shelter which can cause property damage by animal digging and borrowing. Animals such as birds and squirrels are notorious for destroying outdoor furniture by ripping and shredding materials to be used in a nest.

In an attempt to resolve this issue in the past, inflatable devices have been created to attempt to ward off animals or invasive species. A major limitation with these inflation devices is the inflation rate of the inflation member, dependent on the motor or blower used to initiate inflation. Typically, the inflation members inflate at very slow rates which does not cause rapid movement. Thus, animals will become accustomed to the device, and will not be easily scared enough to leave the area. Typically, past inflation devices for wildlife mitigation activate as soon as movement is detected by an animal and deflate shortly after. Thus, another limitation to these past inflation devices is the lack of a randomized component to randomly inflate or deflate the inflation member in order to add an element of surprise. These past inflation devices have predictable movement that animals easily become accustomed to, and therefore will not prevent them from staying in the guarded area.

Thus, there is a long-felt need for tactical training equipment that is affordable, requires little equipment, and has easy guidelines.

There is also a long-felt need for an inflatable tactical training device programmed to inflate rapidly and randomly in order to simulate a realistic live-fire situation during tactical training exercises.

Further, there is a long-felt need for an inflatable tactical training device with a fast rate of inflation to stimulate a realistic live-fire scenario with fast-moving targets.

Still further, there is a long-felt need for an inflation device used in a wildlife mitigation setting that adds a major element of surprise through rapid and randomized movement to scare off animals in a guarded area in order to prevent property damage.

SUMMARY

The present invention broadly comprises an inflation device having a base with a top surface containing an aperture and a control device, a motor having a shaft mounted within the base and controlled by the control device, a propeller fixedly secured to the motor to produce an upward thrust, an inflation member secured to the base, circumscribing the aperture, and arranged for inflation by the upward thrust of the propeller, a plurality of wireless motion sensors spaced in the vicinity of the base to detect the presence of movement and to communicate with the control device to initiate inflation of the inflation member, and a random time generator to control random inflation of the inflation member.

In a preferred embodiment, the present invention further comprises a motor with a speed of at least 8200 RPM to produce an upward thrust for near-instantaneous inflation of the inflation member, although motors operating at a speed below 8200 RPM may also achieve an upward thrust that is sufficient to produce near-instantaneous inflation.

The present invention also comprises a random time generator in communication with a control device, wherein the random time generator is programmed to activate when movement is detected by the motion sensors to generate a time delay from the detection of movement by the motion sensors to initiate the inflation of the inflation member, and/or to control the time the inflation member remains inflated, and/or to control the reactivation of inflation of the inflation member after the initial trigger of the motion sensors.

A primary object of the invention is to provide an inflation device that inflates quickly and has randomized activation and movement.

Another object of the invention is to provide a method for using the inflation device in a tactical training setting, wherein several of the inflation devices are placed in random areas of a tactical training course and a user walks through the course for the purpose of detecting and shooting the inflation device targets comprising the steps of detecting movement of user moving through the training course by a set of said plurality of motion sensors, transmitting radio frequency (RF) signals from said plurality of motion sensors to said receiver of said control devices operating under the same frequency as the first set of plurality of motion sensors, activating said motor, said propeller, said random time generator, and said random noise generator of said inflation device, inflating of said inflation member of any one or all of said inflation devices activated, user detecting the inflating inflation member, user shooting at the inflating inflation member, and repeating the steps from start to finish as the user continues moving through the training course to the end of the course.

A further object of the invention is to provide an inflation device to be used in a tactical training setting that has rapid and random movement to create a realistic live-fire experience to prepare and train military forces, police departments, and civilians on how to react to live-fire situations.

Yet another object of the invention is to provide a method for using the inflation device in a wildlife mitigation setting, wherein several of the inflation devices are placed in random areas of a space that requires control comprising the steps of detecting movement of wildlife within a controlled area by a set of the plurality of motion sensors, transmitting radio frequency (RF) signals from the plurality of motion sensors to the receiver of the control devices operating under the same frequency as the first set of the plurality of motion sensors, activating the motor, the propeller, the random time generator, and the random noise generator of the inflation device, inflating of the inflation member of any one or all of the inflation devices activated, and repeating the steps from start to finish until the plurality of motion sensors no longer detects wildlife movement within the controlled area.

Yet even further, another object of the invention is to provide an inflation device used for wildlife mitigation that has rapid and random movement to prevent situational conditioning of animals to prevent property damage of animals and invading species.

These and other objects, features, and advantages of the invention will become readily apparent to one having ordinary skill in the art upon study of the following detailed description in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
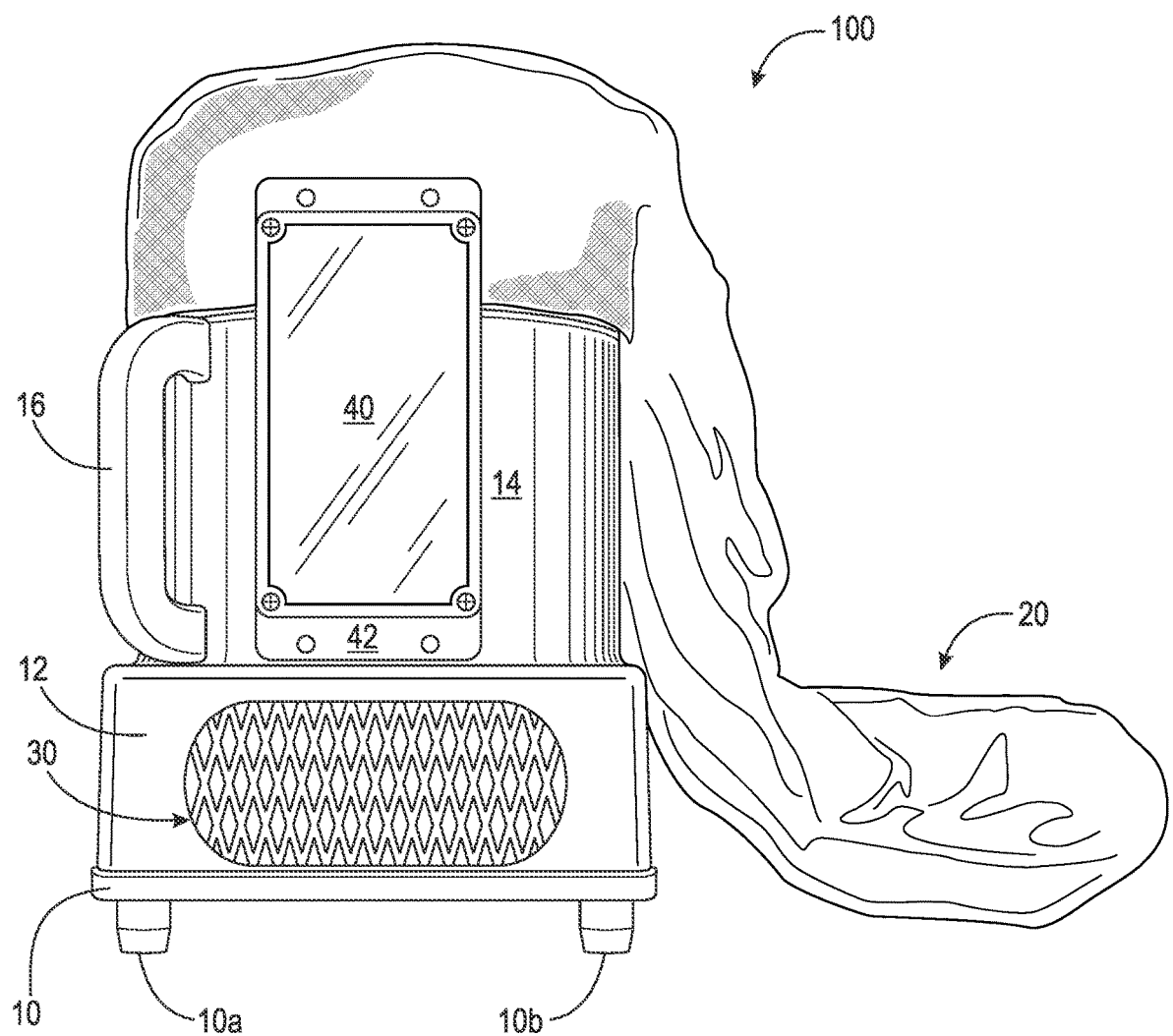
FIG. 1 is a front view of an inflation device in a deflated stage.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims.

It should be further appreciated that the directional terms, e.g., "upward", "downward", "rightward", "leftward", and similar variations thereof, pertain to the corresponding figures described herein as they are illustrated. For example, "component X being positioned rightwardly relative to component Y", means that "component X" is located to the right of "component Y" with respect to the drawing to which it pertains.

Figure 2:
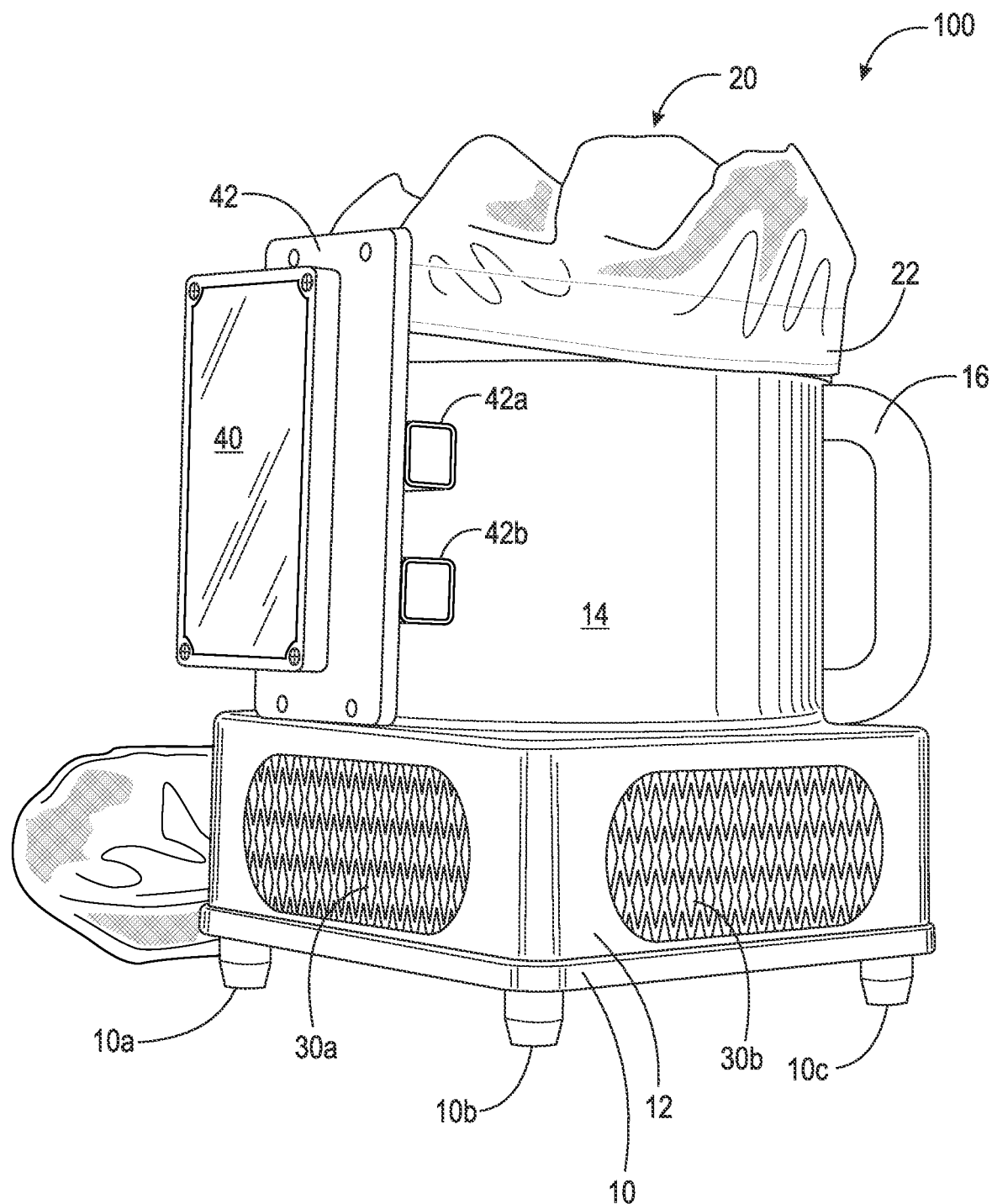
FIG. 2 is a perspective view of the inflation device in a deflated stage.
Figure 3:
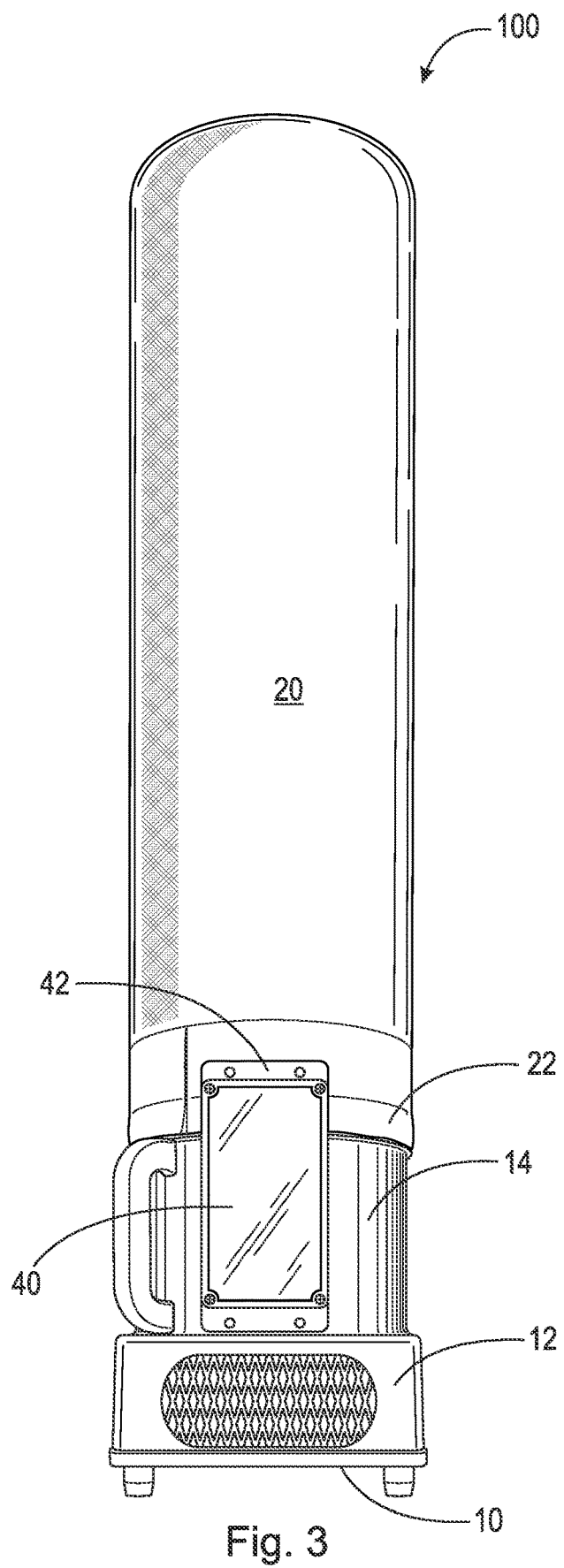
FIG. 3 is a front view of the inflation device shown in FIG. 1 in an inflated stage.

Adverting now to the drawings, the following description should be taken in view of FIGS. 1 through 3. FIG. 1 illustrates a front view of the present invention in a deflated stage and FIG. 2 is a front right perspective view of the present invention in a deflated stage, while FIG. 3 illustrates a front view of the present invention in an inflated stage. Inflatable apparatus 100 generally comprises base 10, case 12, inflatable member mount 14, inflatable member 20, control box mount 42, and control box 40. Base 10 and case 12 are arranged to house the motor of inflatable apparatus 100. It should be appreciated that base 10 and case 12 may be separate components, or alternatively may be an integral housing for the motor, discussed further infra. In situations where inflatable apparatus 100 could be positioned on a mobile assembly, such as a cart, base 10 may not be a necessary component as case 12 could be mounted directly to the cart. Alternatively, base 10 may not be needed in high-temperature environments where there could be a potential for the motor to overheat within case 12. In alternative embodiments it should be understood that base 10 could take many forms, e.g., having raised leg sections and an opening into the inside of case 12 to encourage airflow. In a preferred embodiment, base 10 has a plurality of legs 10a, 10b, 10c, and 10d (shown in FIG. 7), extending therefrom. In situations where base 10 does close the bottom of case 12, exhaust 30 is present. In a preferred embodiment, case 12 has exhausts located on four external sides and base 10 has an exhaust positioned within an outer edge, shown and described infra in view of FIGS. 6 and 7, thus inflatable apparatus 100 in a preferred embodiment has five (5) exhaust locations, four (4) being located on case 12 and one (1) being located within base 10.

Inflatable member mount 14 extends vertically upward from case 12. Inflatable member 20 is fixedly secured to a top edge of inflatable member mount 14. Case 12 could have a removable top surface that is integral to inflatable member mount 14 or may have a top surface that is integral to case 12 containing an aperture that opens to the inside of case 12 and where inflatable member mount 14 is mounted in a manner that collinearly aligns itself with that aperture. Although in a preferred embodiment, inflatable member mount 14 is cylindrical in shape, it may take any shape or size that is appropriate to secure a selected inflatable member thereto. For example, the vertically extending section of inflatable member mount 14 may be rectangular in shape to accommodate a rectangularly shaped inflatable member or the extending section of inflatable member mount 14 may be significantly extended in the vertical direction to accommodate a different motor configuration within case 12, or to simply raise inflatable member 20 to a higher vertical position. In a preferred embodiment, inflatable member mount 14 has an open bottom and an open top, where the bottom allows air flow from a motor-driven propeller positioned within case 12 to be focused upwardly and out from the open top of inflatable member mount 14. In a preferred embodiment, inflatable member mount 14 is substantially cylindrical. Extending from an outside surface of inflatable member mount 14b is handle 16. It should be appreciated that inflatable apparatus 100 could comprise a single handle or a pair of handles depending on the size of inflatable apparatus 100 in order to facilitate easier moving.

Base 10, case 12, and inflatable member mount 14 are all preferably constructed from a rigid and sturdy material, e.g., plastics, polymers, metals. The material selection is important and requires material of a sturdy enough composition to maintain an upright position from approximately instantaneous and continuous inflation of inflatable member 20, i.e., transitioning from a deflated stage as shown in FIG. 1 to an inflated stage as shown in FIG. 3, where the inflated stage may or may not continue for a desired period of time. Additionally, one with ordinary skill in the art could appreciate that due to inflatable member 100 potentially getting hit with a bullet during target use, base 10, case 12, and inflatable member mount 14 could be constructed of bulletproof material, e.g., steel, ceramic, fiberglass, wood, Kevlar® material, polyethylene, and/or polycarbonate, or a combination thereof. It should also be appreciated that control box 40 and control box mount 42 also may be constructed from bulletproof material, e.g., steel, ceramic, fiberglass, wood, Kevlar® material, polyethylene, and/or polycarbonate, or a combination thereof.

FIG. 2 shows first exhaust 30a and second exhaust 30b of case 12. It should be appreciated that case 12 in a preferred configuration has four (4) external surfaces that each have an exhaust arranged thereon, i.e., first exhaust 30a, second exhaust 30b, third exhaust 30c, and fourth exhaust 30d arranged on first external surface, second external surface, third external surface and fourth external surface of case 12, respectively. Exhausts 30a-30e serve a dual purpose of providing an air inlet while allowing airflow within inflatable apparatus 100 to prevent overheating of the motor. FIG. 2 also shows first control box mount standoff 42a and second control box mount standoff 42b. Standoff 42a and standoff 42b are arranged to place control box mount 42 a distance away from the external surface of inflatable member mount 14. Control box 40 is either fixedly secured or removably secured to control box mount 42. In a preferred embodiment of inflatable apparatus 100, the side opposite of control box mount 42 of inflatable member mount 14 is arranged to face a shooter where control box mount 42 has a larger outer perimeter than control box 40 to provide a shield to control box 40 from a projectile. Control box mount 42 may be constructed of the bulletproof materials provided supra, such that it gives control box 40 an extra layer of protection from potential incoming bullets during a tactical target shooter scenario.

The construction and configuration of inflatable apparatus 100 specifically achieve two goals. First, inflatable member 20 is made to remain inflated, or at least substantially upright, after being punctured by a bullet or bullets while revealing a high-visibility inner layer indicating impact through the puncture entrance. Second, the motor-driven propeller is arranged to instantaneously inflate inflatable member 20 and further arranged to continuously inflate inflatable member 20, even when inflatable member 20 is punctured. Inflatable member 20 in a preferred embodiment is two-layer ripstop nylon. In alternative embodiments, one with ordinary skill in the art would appreciate that inflatable member 20 could be constructed from bulletproof materials, e.g., Kevlar® material, aramid fabrics, Kevlar® material and ripstop nylon combination, or high-density ultra-high molecular weight polyethylene (UHMWPE), to afford continuous target practice with inflatable member 20.

Inflatable member 20 in a preferred embodiment comprises two layers, an outer layer, and a high-visibility inner later. Outer layer 21 is the layer that comprises the outside surface of inflatable member 20. The construction of inflatable member 20 is discussed in further detail, infra.

Inflatable apparatus 100 in FIGS. 1 and 2 is shown in a deflated position, that is, an inactive position where the motor of inflatable apparatus 100 has not been turned on. Inversely, FIG. 3 shows inflatable apparatus 100 in an inflated position, that is, an activated position where the motor of inflatable apparatus 100 has been turned on and is forcing air through inflatable member mount 14 into an internal hollow-space of inflatable member 20. The activated position or inflatable position of inflatable apparatus 100 can be momentary or continuous, however, the timing between the positions shown in FIGS. 1 and 2 versus FIG. 3, is substantially instantaneous, that is, inflatable member 20 inflates immediately upon activation of the motor of inflatable apparatus 100. This configuration requires the strong material examples, provided supra, to ensure inflatable member 20 does not become damaged from the rapid inflation and is provided by a specific configuration and selection of the motor and propeller of inflatable apparatus 100, discussed further infra.

Figure 4:
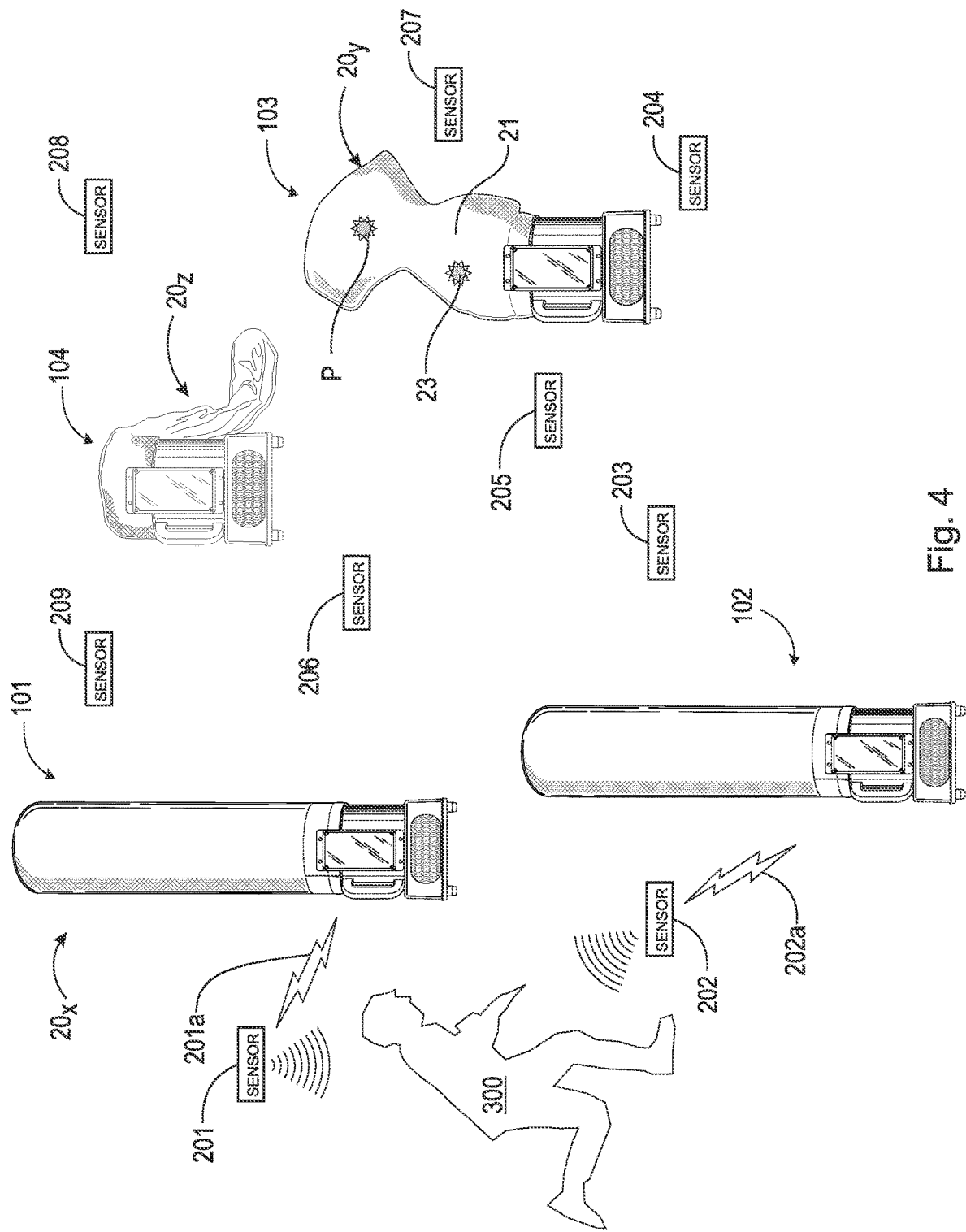
FIG. 4 is an overview of multiple inflation devices shown in FIGS. 1-3, and their corresponding sensors.

FIG. 4 illustrates an overview of multiple inflation devices shown in FIGS. 1-3, and their corresponding sensors, preferably arranged in a tactical shooter scenario. Specifically, inflatable apparatuses 101, 102, 103, and 104 are shown spaced apart, in any distance that would be acceptable to provide a realistic tactical shooter training scenario. One having ordinary skill in the art would appreciate that although there are only four (4) inflatable apparatuses illustrated, the example of the tactical shooter scenario is merely exemplary, and the quantity of inflatable apparatuses is dependent on the needs of each tactical shooter scenario.

Inflatable apparatuses 101, 102, 103, and 104 are in wireless communication with a plurality of motion sensors. In the exemplary embodiment of a tactical shooter training scenario, there are nine (9) motion sensors, motions sensors 201-209. Motion sensors 201-209 may be programmed to communicate with one inflatable apparatus, or multiple apparatuses, to trigger activation of the motor to inflate the respective inflatable member. In FIG. 4, motion, e.g., walking, running, etc., from trainee 300 is detected from motion sensors 201 and 202. Motion sensors 201 and 202 upon detecting the motion, wirelessly transmit the confirmed detection, via wireless signals 201a and 202a to corresponding inflatable apparatuses 101 and 102, respectively. Wireless signals 201a and 202a signal an onboard microcontroller to activate the motors of inflatable apparatuses 101 and 102 to instantaneously inflate their respective inflatable members. Inflatable apparatus 104 is shown with deflated inflatable member 20z, where inflatable apparatus 104 has not received a wireless signal from motions sensors 206, 208, and/or 209. Inflatable apparatus 103 is shown with partially-inflated inflatable member $20_y$/punctured inflatable member $20_y$. Partially-inflated inflatable member $20_y$/punctured inflatable member $20_y$ illustrates an inflatable member that has been shot by trainee 300 with a plurality of bullets, creating puncture P to partially-inflated inflatable member $20_y$/punctured inflatable member $20_y$. Puncture P reveals high-visibility inner later 23 of partially-inflated inflatable member $20_y$/punctured inflatable member $20_y$. High-visibility inner later 23 is designed to indicate a successful shot from trainee 300, or alternatively, indicate an unsuccessful shot if the particular inflatable apparatus was not designated as a target.

It should be appreciated that although FIG. 4 shows motion sensor 201 sending signal 201a to inflatable apparatus 101, that any of motion sensors 201-209 may be configured to trigger inflatable apparatuses 101, 102, 103, and/or 104. This may be achieved by an onboard Bluetooth transceiver equipped on motions sensors 201-209 and equipped within a microcontroller of inflatable apparatuses 101, 102, 103, and 104. It should also be appreciated that Bluetooth capabilities are not an exclusive wireless communication method, and that other, proximity-based wireless protocols could be used, e.g., RFID, radio, etc. In a preferred embodiment, motions sensors 201-209 are equipped with Bluetooth capability and multiple motions sensors may be paired to a single inflatable apparatus. By having two, or more motion sensors paired to a single inflatable apparatus, false-positive motion indications from motion sensors can be absolved by requiring more than a single motion sensor to trigger the motor of an inflatable apparatus.

Figure 5:
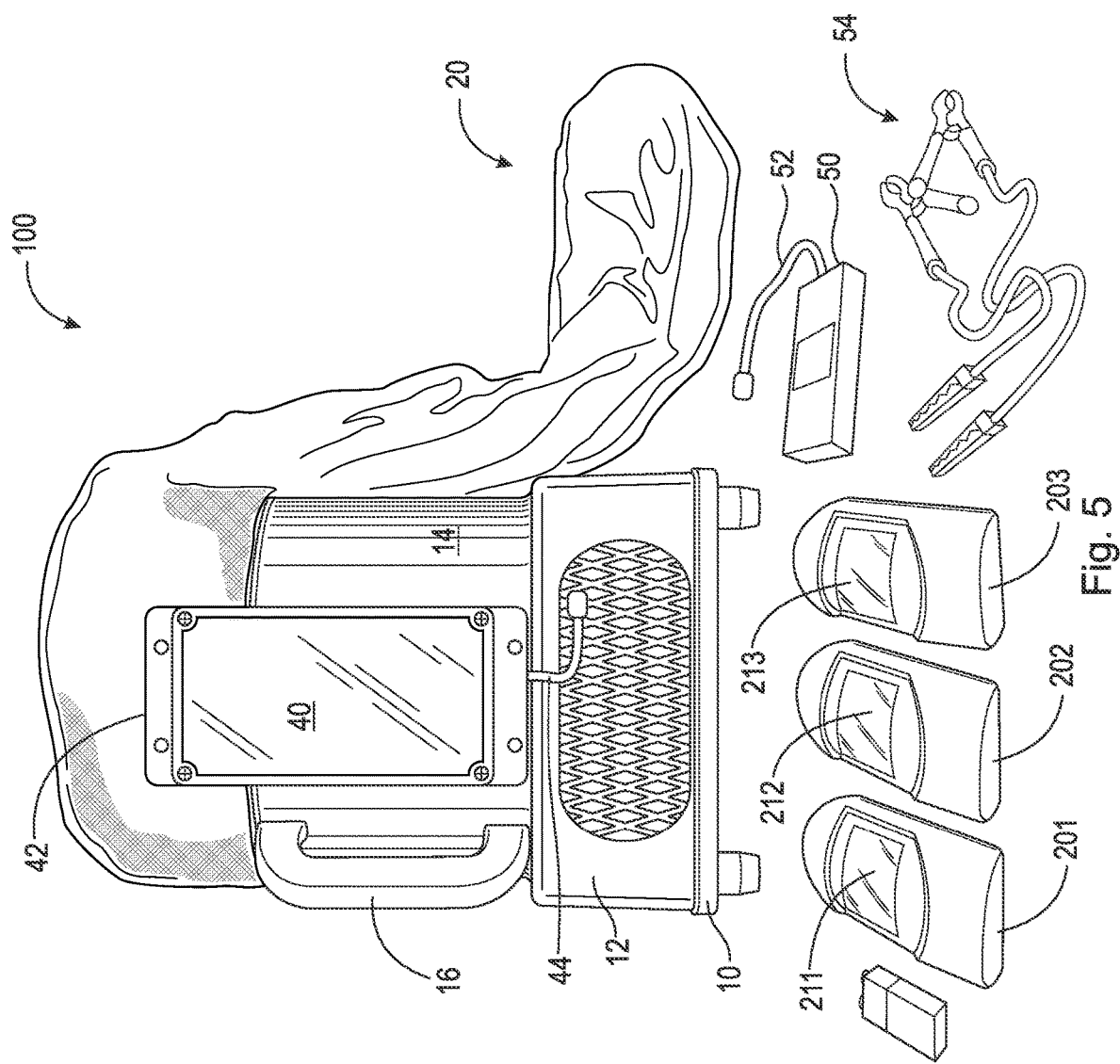
FIG. 5 is a front perspective view of the inflation device shown in FIG. 1 with corresponding external components.

FIG. 5 illustrates a front view of inflatable apparatus 100 in addition to its respective external components. Extending from control box 40 is power input 44. Power input 44 could be any acceptable connection means to provide power to inflatable apparatus control box 40 and the motor, from a battery, 110-volt outlet, or the like. In the exemplary embodiment shown in FIG. 5, portable power device 50 is shown having power output 52. Portable power device 50 may be an external battery, such as a lithium-ion rechargeable battery. Power output 52 is arranged to engage power input 44 to power apparatus 100. Alternatively, power input 44 may be arranged to connect to alligator clips 54 to power apparatus 100 from a standard car battery. One with ordinary skill in the art should ascertain that power input 44 is designed to connect to a plurality of power sources to allow for ease of transportation, setup, and use of apparatus 100 in a variety of different settings. It should also be appreciated that although the power source, exampled by portable power device 50, is shown as an external component, however, a rechargeable battery could be integral with apparatus 100.

Motions sensors 201, 202, and 203, are also shown in FIG. 5. In a preferred embodiment, the motion sensors are equipped with passive infrared sensors (PIR), 211, 212, and 213, that send a wireless signal to a receiver within control box 40 to activate the motor of inflatable apparatus 100. An example of a PIR motion sensor can be found at https://www.walmart.com/ip/4vwin-motion-sensor-for-wireless-driveway-alert/791708958. As discussed supra, in alternative embodiments, a PIR motion sensor of inflatable apparatus 100 could also be equipped with a Bluetooth transceiver to pair/wirelessly connect to the control box of inflatable apparatus 100 and/or additional inflatable apparatuses.

Figure 6:
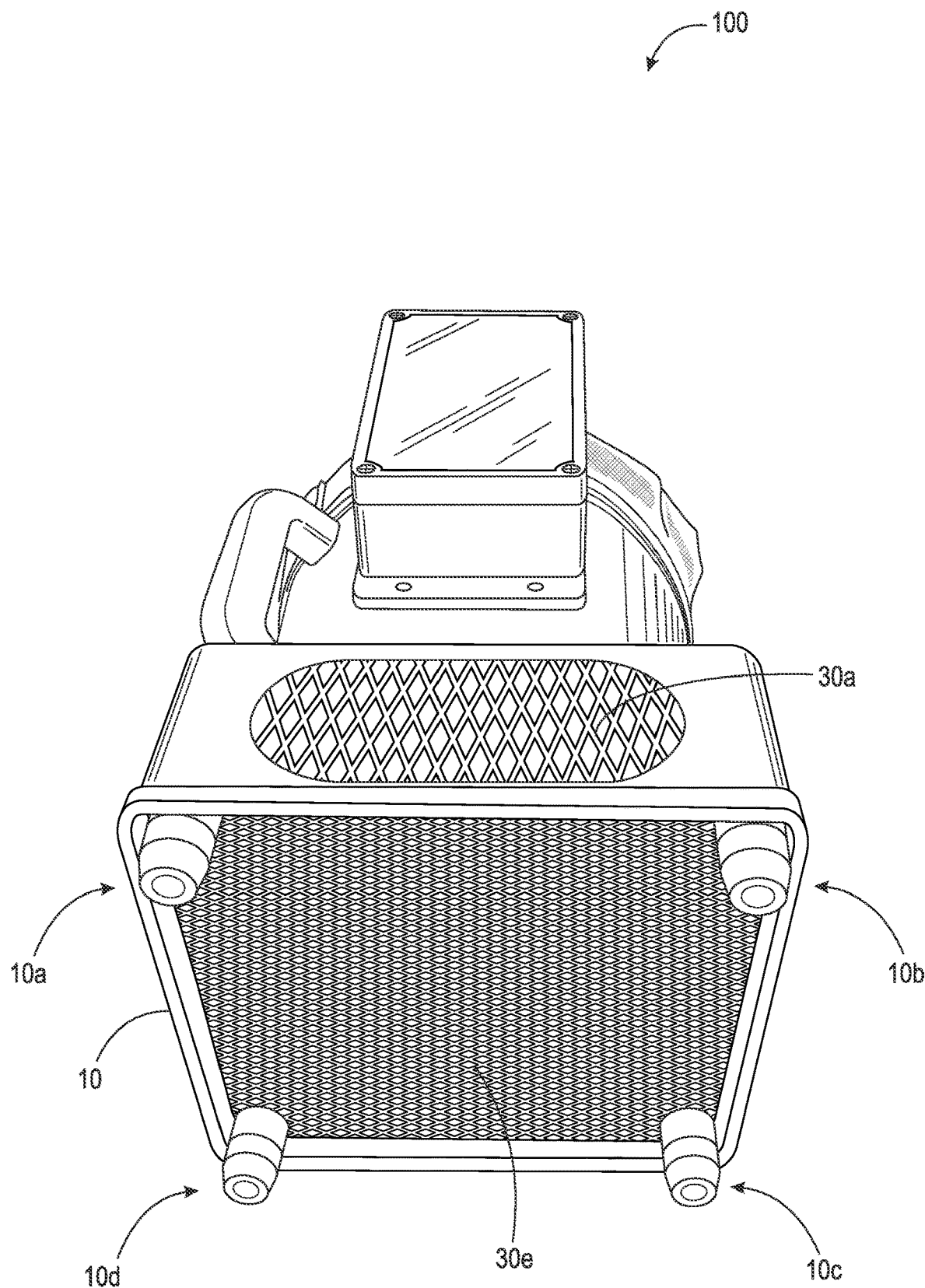
FIG. 6 is a bottom perspective view of the inflation device shown in FIG. 1.
Figure 7:
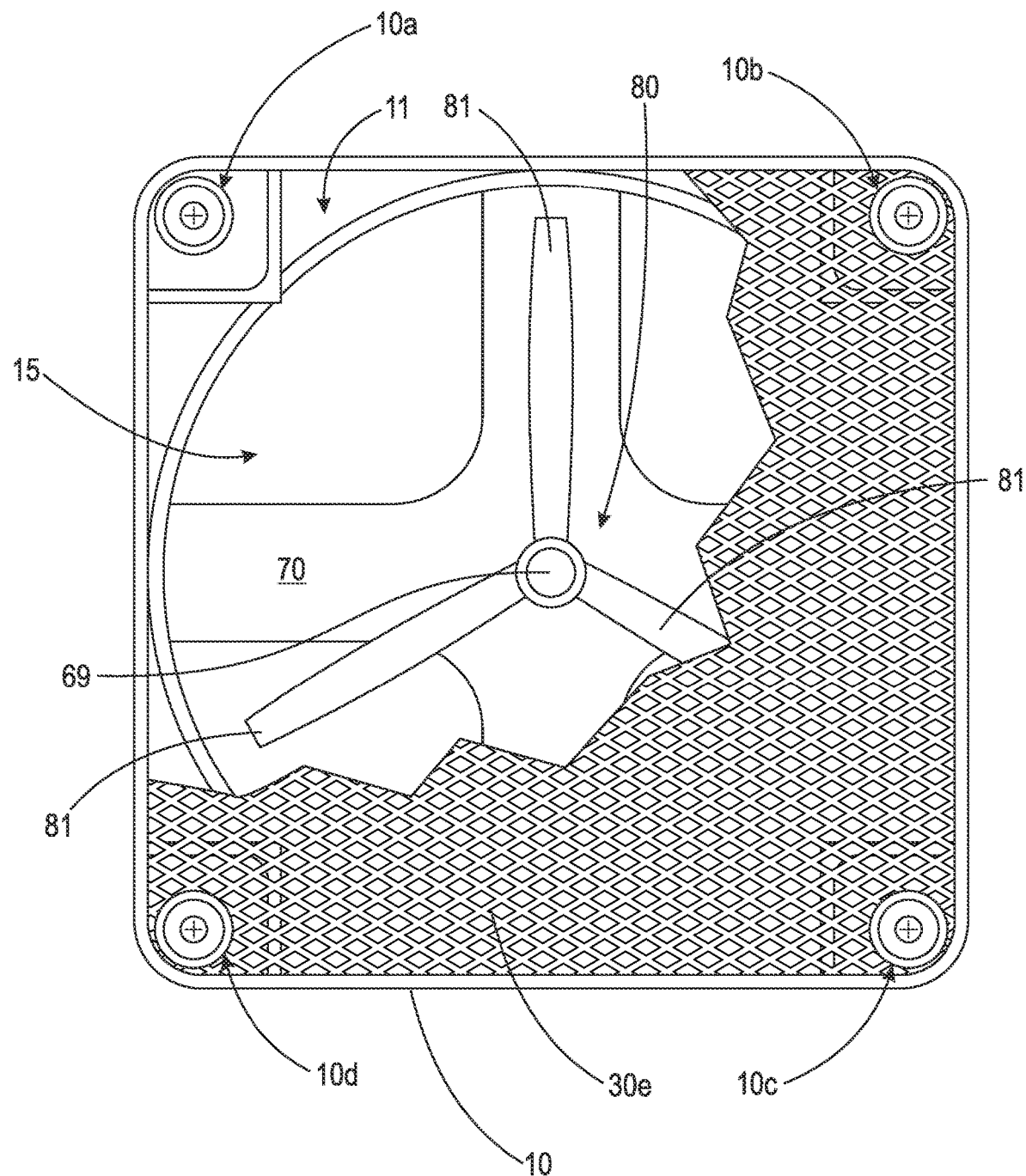
FIG. 7 is a bottom view of the inflation device shown in FIG. 1 with Bottom exhaust port 30e partially cut-away.

The following description should be taken in view of FIGS. 6 and 7. FIGS. 6 and 7 illustrate a perspective bottom view of inflatable apparatus 100 and a bottom view of inflatable apparatus 100, where lower exhaust 30e is partially removed, respectively. As discussed supra, base 10 is located at the bottom of case 12. In a preferred embodiment, case 12 has a substantially box-like shape having four (4) external surfaces. On each of the four (4) external surfaces of case 12 are exhaust ports 30a-30d, whereas one of each of exhaust ports 30a-30d are located on each of the respective external surfaces of case 12. Base 10 in a preferred embodiment extends from the bottom edge of case 12 and is a substantially square-like rim having rounded corners. Extending from the inside surface of each of the corners of base 10 are shelves. Each of the shelves of base 10 are arranged to threadably secure feet 10a-10d. Feet 10a-10d of base 10 are arranged to raise the bottom surface of base 10 off the ground to create a space between the bottom surface of base 10 and the bottom of feet 10a-10d to encourage airflow through base 10 and case 12 created from propeller 80 when the motor of inflatable apparatus 100 is activated. Exhaust ports 30a-30d also facilitate airflow through base 10 and case 12. Collectively, exhaust ports 30a-30e additionally provide airflow to prevent the motor of inflatable apparatus 100 from overheating in extreme temperature climates and/or in situations of extended use of inflatable apparatus 100.

Located within base 10, case 12, and inflatable member mount 14 is main mount 70. Main mount 70 is preferably a polycarbonate mount that is arranged to hold the motor of inflatable apparatus 100 in a central location. Main mount 70 may alternatively be constructed of any other suitable material that is rigid and sturdy enough to maintain its positioning when the motor of inflatable apparatus 100 is activated to spin propeller 80, e.g., metal, polycarbonates, metal and plastic combinations, etc. Main mount 70 may be fixedly secured to either the inside surfaces of case 12 or the inside surfaces of inflatable member mount 14. Main mount 70 is preferably located within internal cavity 15 of inflatable member 14. Main mount 70 is arranged to have a plurality of arms that are arranged to extend and secure to the inside surface of inflatable member mount 14. The exemplary illustration of FIG. 7 shows main mount 70 with four (4) arms, however it should be appreciated that any number of arms of main mount 70 may be acceptable to secure main mount 70 within inflatable member mount 14 or within case 12 so long at the motor and propeller 80 remain in a central location within cavity 15 during use and after multiple extended and/or repetitive uses.

Figure 8:
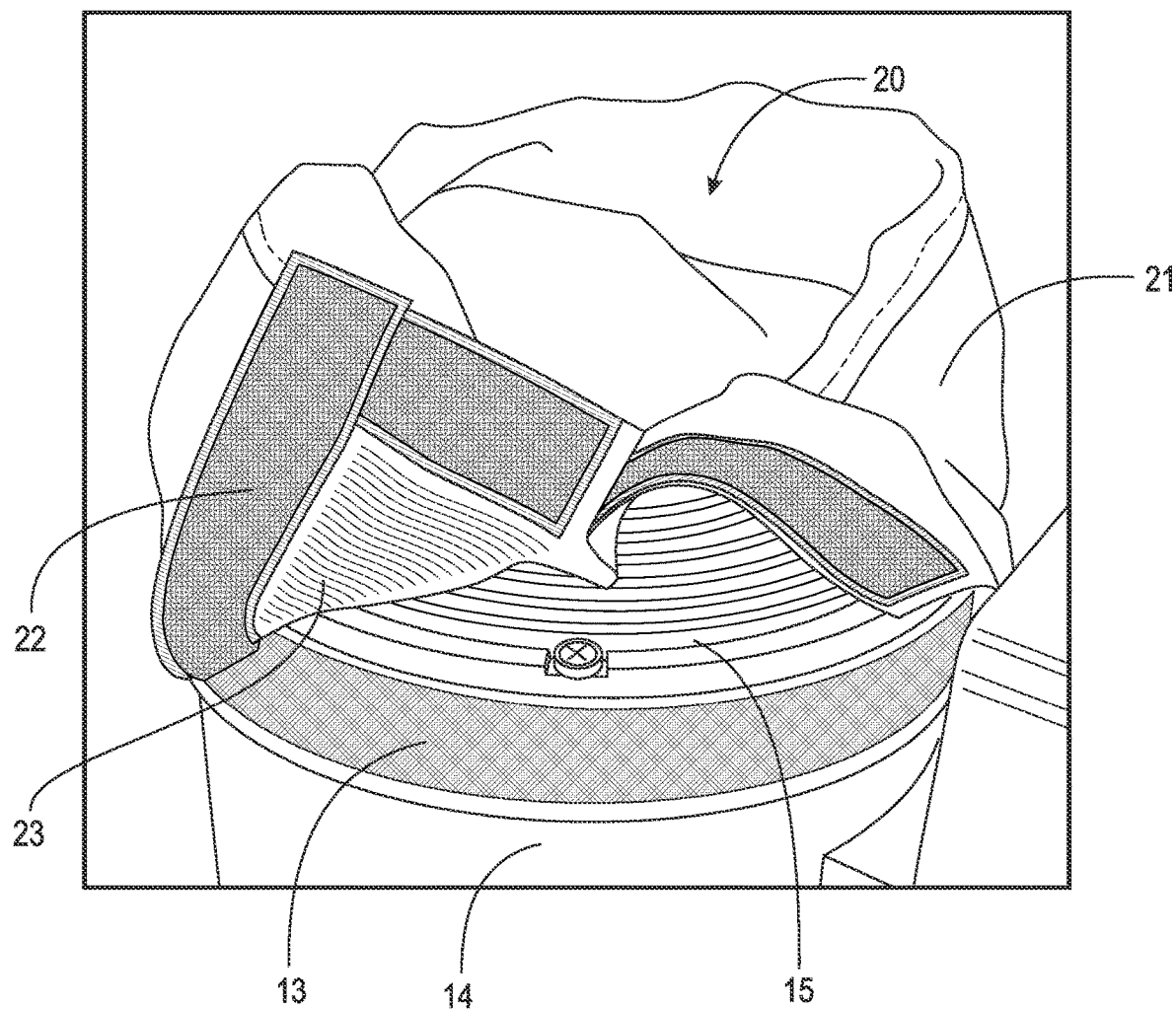
FIG. 8 is a partial perspective view of the inflation device shown in FIG. 1 with inflatable member 20 partially removed.

FIG. 8 illustrates a partial perspective view of inflatable apparatus 100 with inflatable member 20 partially removed, specifically showing an exemplary means of attaching inflatable member 20 to inflatable member mount 14. Inflatable member 20 also includes inflatable member attachment means 22. Inflatable member attachment means 22 is a suitable attachment method of adhering, affixing, removably attaching inflatable member 20 to the top opening of inflatable member mount 14. It should be appreciated that inflatable member 20 requires removability from inflatable member mount 14 should inflatable member 20 sustain excessive punctures from tactical training use, i.e., bullet holes, and needs replacement. Inflatable member attachment means 22 is arranged to removably engage inflatable member anchor 13 of inflatable member mount 14. Attachment means 22 of inflatable member 20 and anchor 13 of inflatable member mount 14 in a preferred embodiment may be hook and loop fasteners, whereas attachment means 22 of inflatable member 20 may be the hook fastener and anchor 13 of inflatable member mount 14 may be the loop fasteners, or vice versa. Alternatively, attachment means 22 of inflatable member 20 and anchor 13 of inflatable member mount 14 may be a plurality of buttons and snaps, respectively.

Attachment means 22 of inflatable member 20 are preferably arranged on the bottom end of inflatable member 20, that is, the end of inflatable member that is arranged to engage inflatable member mount 14. Attachment means 22 of inflatable member 20 are integrally affixed to the inside surface of inflatable member 20, specifically, attachment means 22 of inflatable member 20 are affixed to the inside surface of inner layer 23 of inflatable member 20.

Figure 9:
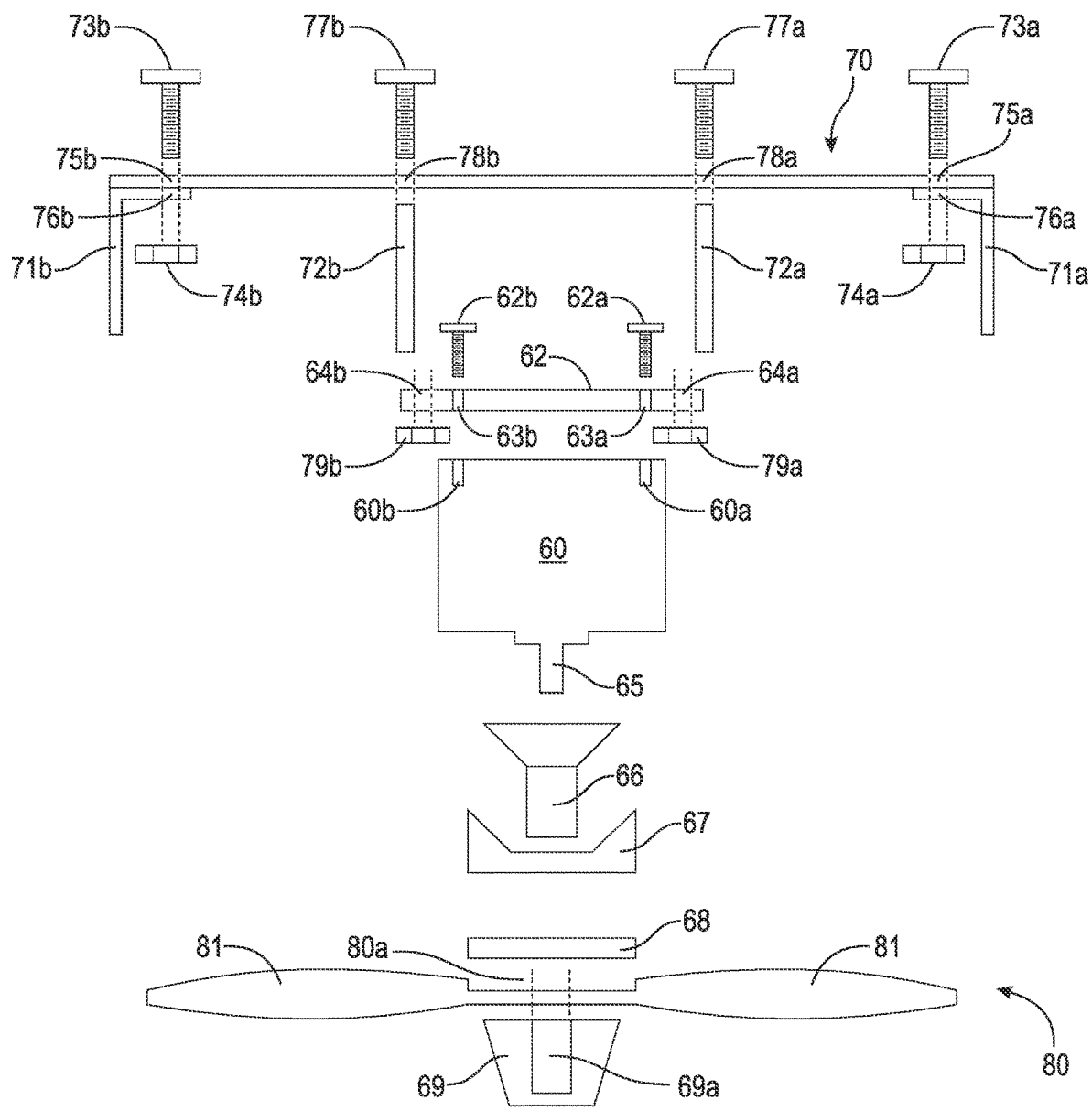
FIG. 9 is an orthographic exploded view of the motor and propeller assembly.

FIG. 9 illustrates an orthographic exploded view of the attachment components for securing the motor and the propeller of inflatable apparatus 100 within inflatable member mount 14. Main mount 70 provides the structure for the motor assembly to be secured within inflatable member mount 14 of inflatable apparatus 100. Arranged at opposite ends of main mount 70 are L-bracket mounting apertures 75a and 75b that align with apertures 76a and 76b of L-brackets 71a and 71b, respectively. L-brackets 71a and 71b are secured to main mount 70 via L-bracket screws 73a and 73b threadably engaging L-bracket bolts 74a and 74b, respectively. L-brackets 71a and 71b are arranged to either removably secure or fixedly secure to the inside surface of inflatable member mount 14. Located proximate to the center point of main mount 70 are mounting apertures 78a and 78b, which are substantially equally spaced from the center point of main mount 70. Mounting apertures 78a and 78b are arranged to accept motor mount screws 77a and 77b. Standoffs 72a and 72b are arranged to slide over the threaded portion of motor mount screws 77a and 77b, where standoffs 72a and 72b are sandwiched in between mounting plate 62 and main mount 70. The threaded portion of motor mount screws 77a and 77b that exits standoffs 72a and 72b engage apertures 64a and 64b of mounting plate 62 and secured thereto via bolts 79a and 79b. Mounting plate 62 also includes motor mounting apertures 63a and 63b. Motor screws 62a and 62b pass through motor mounting apertures 63a and 63b and threadably engage and secure motor 60 to mounting plate 62 via mounting apertures 60a and 60b. Mounting plate 62 in a preferred embodiment may resemble the Motor Mount: Apprentice 15e, https://www.horizonhobby.com/product/motor-mount-apprentice-15e/EFL2734.html.

It should be appreciated that although FIG. 9 illustrates the abovementioned components in pairs, i.e., main mount 70 with two arms, the mounting configuration is identical for a four (4) arm main mount 70, or a three (3) arm main mount 70. That is, there could be four (4) L-brackets, four (4) standoffs, etc.

Motor 60 includes motor shaft 65. Motor shaft 65 is arranged to connect propeller 80 to motor 60. To connect propeller to motor shaft 65, adaptor screw 66 is first secured to motor shaft 65. Adaptor screw 66 has a collet arranged on the end that accepts motor shaft 65 to secure adaptor screw 66 to motor shaft. Adaptor screw 66 has another end arranged away from the collet end that mates with receiver 67. Receiver 67 preferably threadably secures to adaptor screw 66 and is arranged to engage propeller 80 and nose cone 69 at nose cone aperture 69a. Adaptor screw 66 and receiver 67 may be a singular piece like the Rimfire EF1 Motor Collet Style Adapter found at https://www.horizonhobby.com/product/rimfire-ef1-motor-collet-style-adapter/GPMG4916.html. Sandwiched between receiver 67 and nose cone 69 is washer 68 and propeller 80. Adaptor screw 66 has a shaft that engages washer 68, propeller aperture 80a, and nose cone aperture 69a, where nose cone 69 threadably secures the components to motor shaft 65. Preferably, propeller 80 has an annular groove circumscribed about propeller aperture 80a that is arranged to accept washer 68 within. Propeller 80 in a preferred embodiment is a Master Airscrew 3 Blade 8×6 Propeller that can be purchased at: https://www.horizonhobby.com/product/3-blade-propeller-8-x-6/MAS0860T.html. It should be appreciated that the annular groove circumscribing propeller aperture 80a is not a stock component of the Master Airscrew 3 Blade 8×6 Propeller, and in a preferred embodiment is added to ensure the best fitting.

Motor 60 in a preferred embodiment is a motor capable of producing 8200 RPM of propeller 80 during operation. Specifically, motor 60 is a Power 15 Brushless Outrunner Motor, 950 Kv: 3.5 mm Bullet, found at http://www.horizonhobby.com/product/power-15-brushless-outrunner-motor-950 kv-3.5 mm-bullet/EFLM4015A.html. Motor 60 must be specifically selected in order to produce substantially instantaneous inflation of inflatable member 20. Motor's that do not produce the power output exampled by the Power 15 Brushless Outrunner Motor, 950 Kv: 3.5 mm Bullet, will not allow for inflatable member 20 to be inflated a rate rapid enough to provide effective tactical shooter training and will not allow a substantially-punctured inflatable member to be inflated upright. Additionally, the rapid inflation of inflatable member 20 creates noise while additionally creating an aggressive "pop-up" action of inflatable member 20. Both characteristics aid in the realistic effects needed to effectively train gunmen, as real-life scenarios require split-second decisions from personnel, i.e., efficiently, and accurately determining targets from civilians. As depicted in FIG. 4, the training scenario may configure inflatable members of the plurality of inflatable apparatuses to be differentiated between targets or hostiles and civilians by changing the color of the inflatable members' outer layers. Coupling the differentiated colors with the substantially instantaneous inflation of inflatable member 20 provided by motor 60, plus the noise produced from the act of inflating inflatable member 20, creates the most realistic scenario for tactical shooter training by simulating stressful noises and aggressive visual cues for the trainees. Although a motor having a rotational speed of 8200 RPM is used in a preferred embodiment of the present invention, it should be appreciated that motors having speeds below 8200 RPM might also be suitable to effect the "near-instantaneous" inflation of the inflatable member. By "near-instantaneous" we mean extremely fast, probably less than one second, and even less than one-half second.

Figure 10:
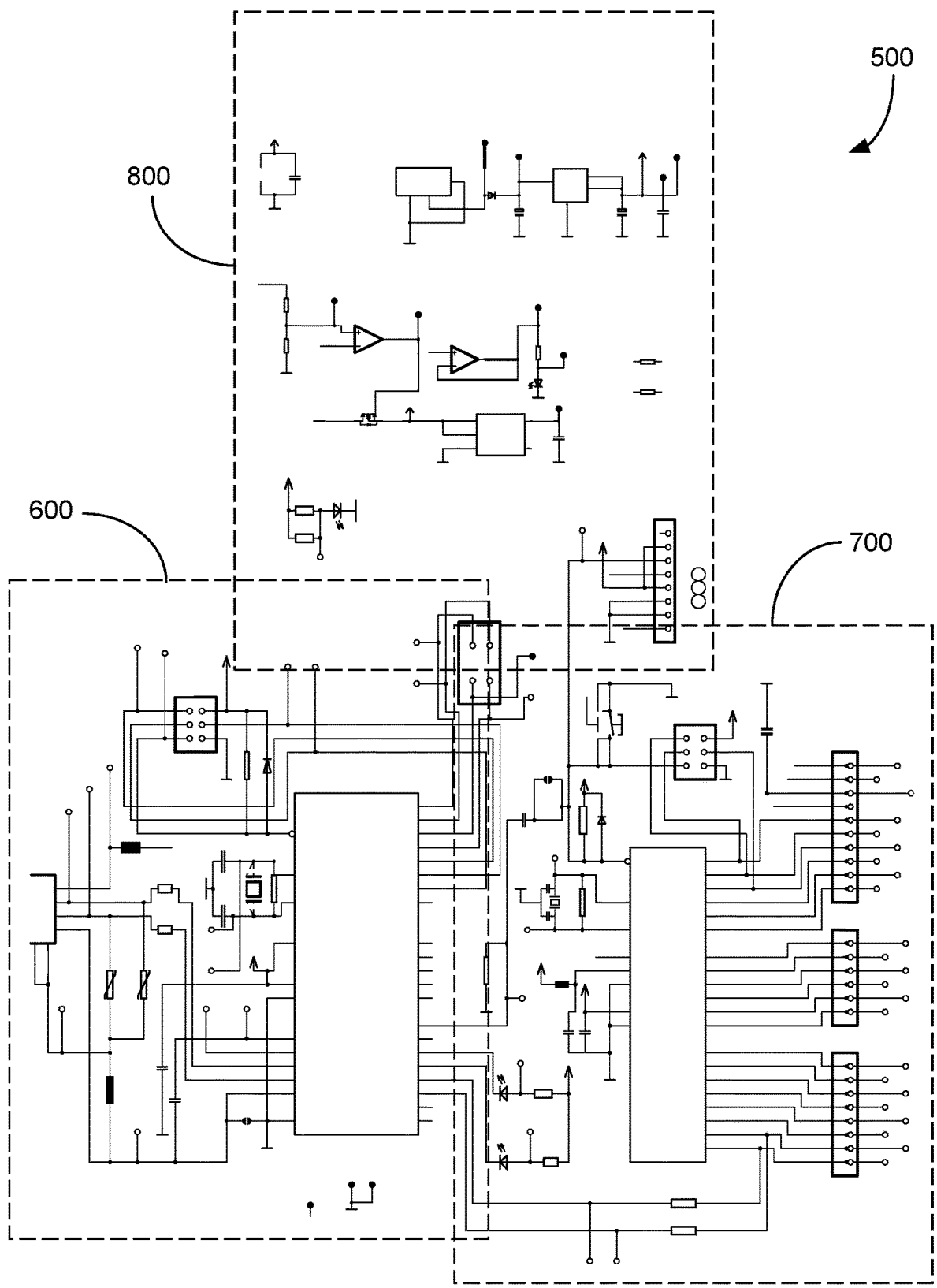
FIG. 10 is a schematic overview of the controller circuit 500, which includes sub-interconnected circuits 600, 700 and 800.
Figure 11A:
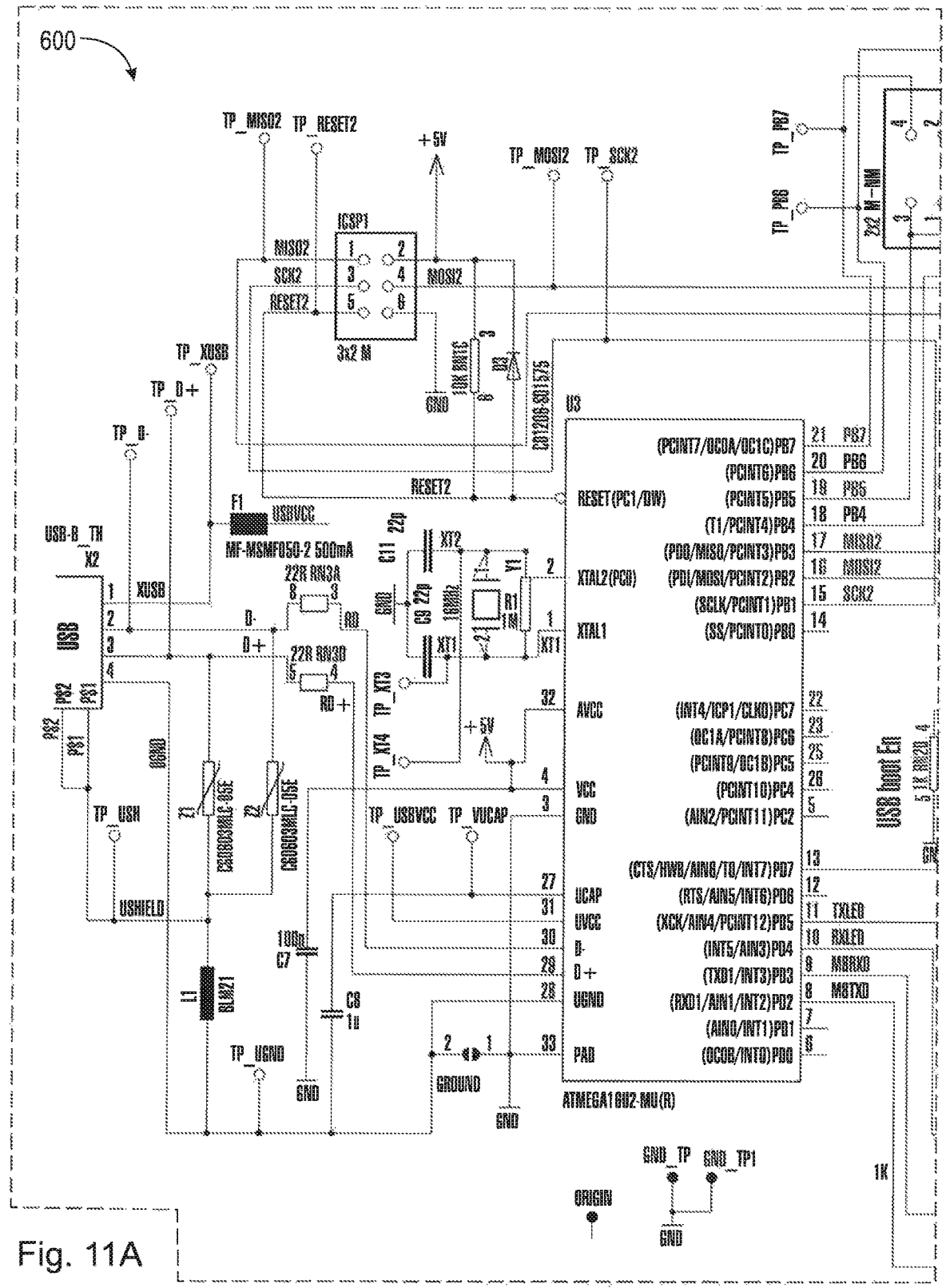
FIG. 11A is a partial view of an electronic schematic for sub-circuit 700 shown in FIG. 10.
Figure 11B:
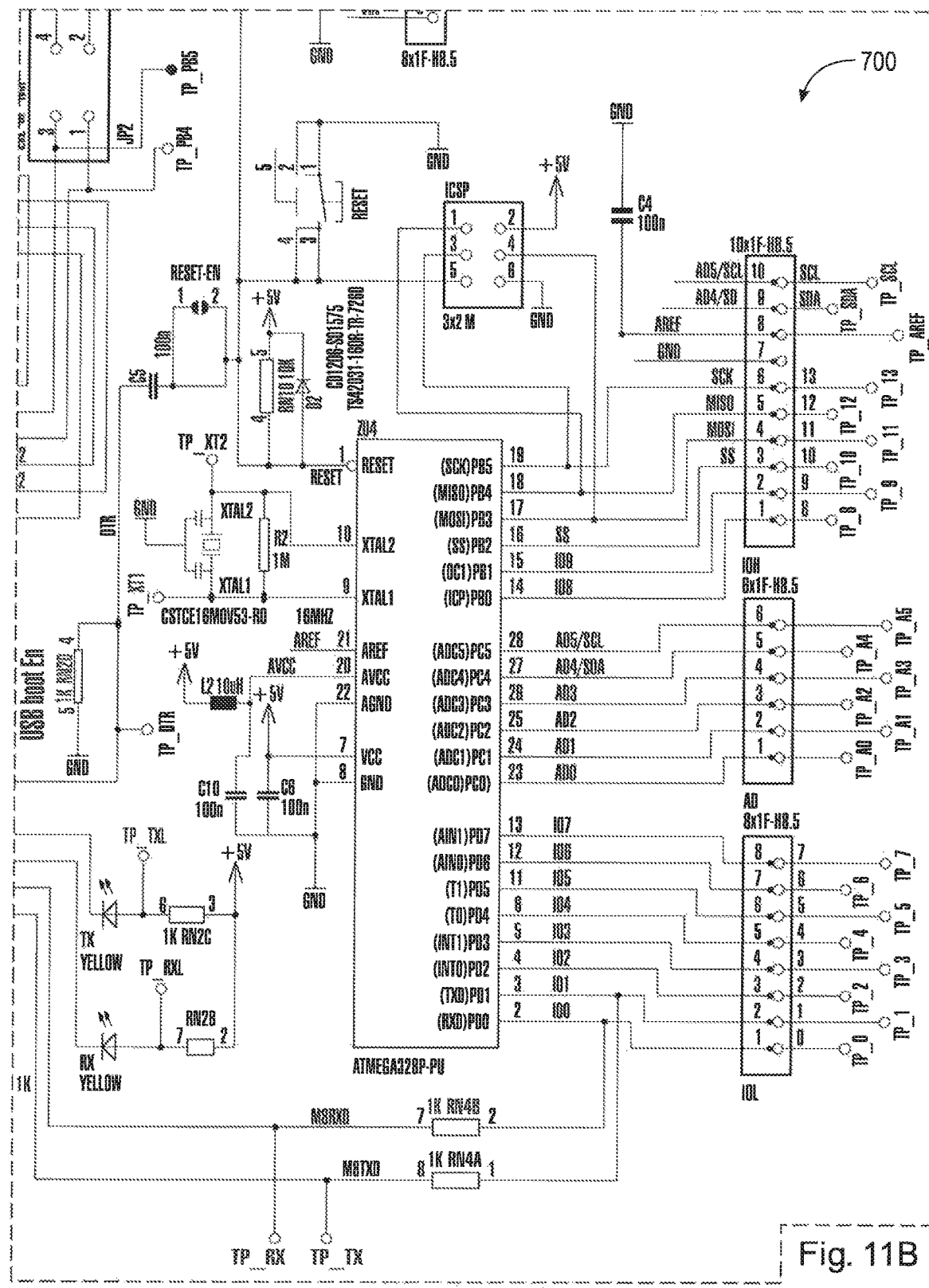
FIG. 11B is a partial view of an electronic schematic for sub-circuit 800 shown in FIG. 10.
Figure 11C:
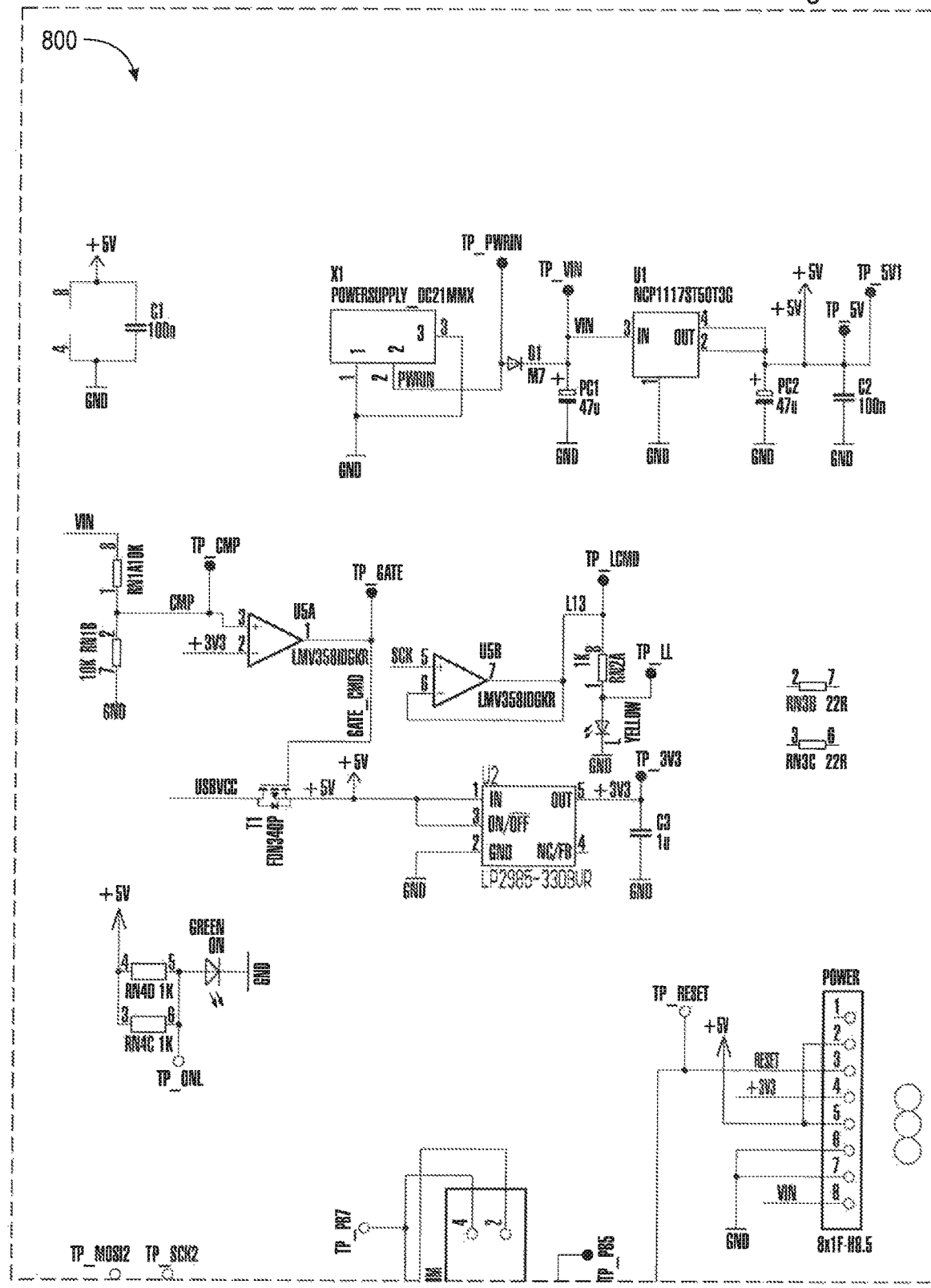
FIG. 11C is a partial view of an electronic schematic for sub-circuit 600 shown in FIG. 10.

FIG. 10 illustrates the full circuit schematic for the Ardunio Uno Rev3, controller circuit 500 while FIGS. 11A-11C divide the electronic schematic shown in FIG. 10 into its respective sections: first sub-circuit 600; second sub-circuit 700; and, third sub-circuit 800, respectively. In a preferred embodiment, the schematic employed in the present invention can be found and purchased at https://store-usa.arduino.cc/products/aruino-uno-rev3/, whereas the control of the motor, receiving of motion signals from corresponding alarms, and communicating with the motor of inflatable apparatus 100 is done via an Arduino Uno Rev3 microcontroller board that is based on the ATmega328P. The corresponding datasheet for the Arduino Uno Rev3 microcontroller can be found at http://ww1.microchip.com/downloads/en/DeviceDoc/Atmel-7810-Automotive-Microcontrollers-ATmega328P_Datasheet.pdf.

The microcontroller, preferably the Ardunio Uno Rev3 as described above, includes a pinout that includes a plurality of digital pins. In a preferred embodiment the pins are either configured as inputs or outputs and are arranged to handle 0 v DC to 5 v DC, whereas an activation or "HIGH" is +5 v DC and deactivation, or "LOW" is GND. The preferred pinout of the microcontroller is as follows:

0. Not utilized
1. Not utilized
2. Not utilized
3. Not utilized
4. Not utilized
5. Not utilized
6. GND (i.e., Power)—Output
7. +5 v DC (i.e., Power)—Output
8. Not utilized
9. Not utilized
10. Single for inflatable member (i.e., Low to High)—Output
11. Signal for inflatable member (i.e., High to Low)—Output
12. Signal from motion control board—Input
13. Status Light (i.e., indicates the program loop is in progress)—Output The microcontroller in a preferred embodiment is in a constant loop while waiting for a motion sensor to trigger. When the motion sensor triggers its respective input (Pin 12), preferably arranged on a motion control board on the microcontroller, the input sends +5 v DC into digital Pin 12, the following process begins:

1. Pin 13 goes HIGH to turn on an onboard LED that is arranged to indicate the program is running;
2. Pin 11 goes LOW, and Pin 10 goes HIGH to activate the motor;
3. Step 2 persists for approximately 30 seconds (i.e., the inflatable member is inflated and is continuously inflated);
4. After Step 3, Pins 11 and 10 revert to their original positions, HIGH and LOW, respectively;
5. A delay of proximately of 10 seconds is initiated to allow the motor to cool down;
6. Pin 13 goes LOW which deactivates the LED that was activated in Step 1; and,
7. The process ends until+5 v DC is received by Pin 12 to restart the process at Step 1.

The steps provided supra for activation of the motor may be delayed via a random number generator programming protocol provided by the code applied to the microcontroller. The random number generator program delays the signal transmission from the microcontroller to the motor control board based on the random numbers, e.g., 10-second delay, 30-second delay. The random number generator programming protocol adds to the realism of the tactical shooter scenario, as it prevents trainees from being accustomed to a predictable and regular activation of the inflatable apparatus. The protocol also serves to create instances where a trainee may have completely passed a motion sensor, the signal was sent to the microcontroller, and the protocol induced a 30-second delay, which in turn will activate the inflatable apparatus when the trainee presumably has passed the device, i.e., the apparatus inflates behind the trainee, requiring the trainee to turn completely around to assess the "target"—promoting greater situational awareness and responsiveness.

Figure 12:
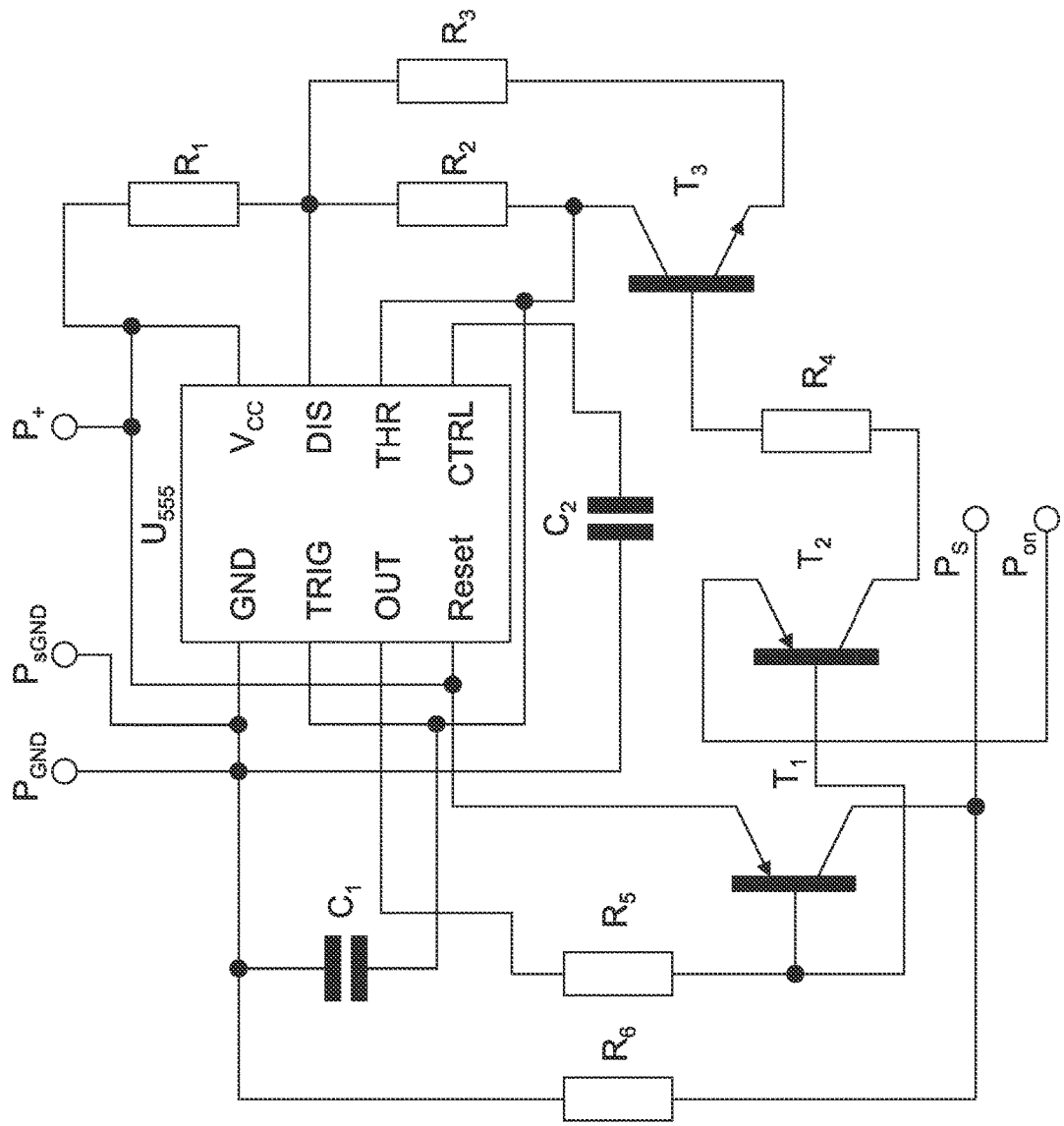
FIG. 12 is a schematic circuit diagram of the motor controller of the present invention; and, FIG. 13 is an overview of multiple inflation devices shown in FIGS. 1 and 2, and their corresponding sensors.

FIG. 12 illustrates the electronic schematic for the motor control board that communicates with the microcontroller described supra. The motor control board receives a signal when Step 2, described supra, is initiated and is in electronic communication with the microcontroller. The motor control board most notably includes timer $U_{555}$ which, in a preferred embodiment, is any well-known 555 timer, e.g., a Texas Instruments LM555 Timer, that can produce accurate time delays or oscillation to afford the timing protocols discussed supra. $R_1$ is a 27 kOhm ¼ watt resistor. $R_2$ and $R_3$ are 2 kOhm ¼ watt resistors. $R_4$ and $R_6$ are 10 kOhm ¼ watt resistors. $R_5$ is a 5 kOhm ¼ watt resistor. $C_1$ is a 1 uF tantalum capacitor. $C_2$ is a 0.01 uF ceramic capacitor. $T_1$ and $T_2$ are 2N3906 PNP transistors. $T_3$ is a 2N3904 NPN transistor.

Figure 13:
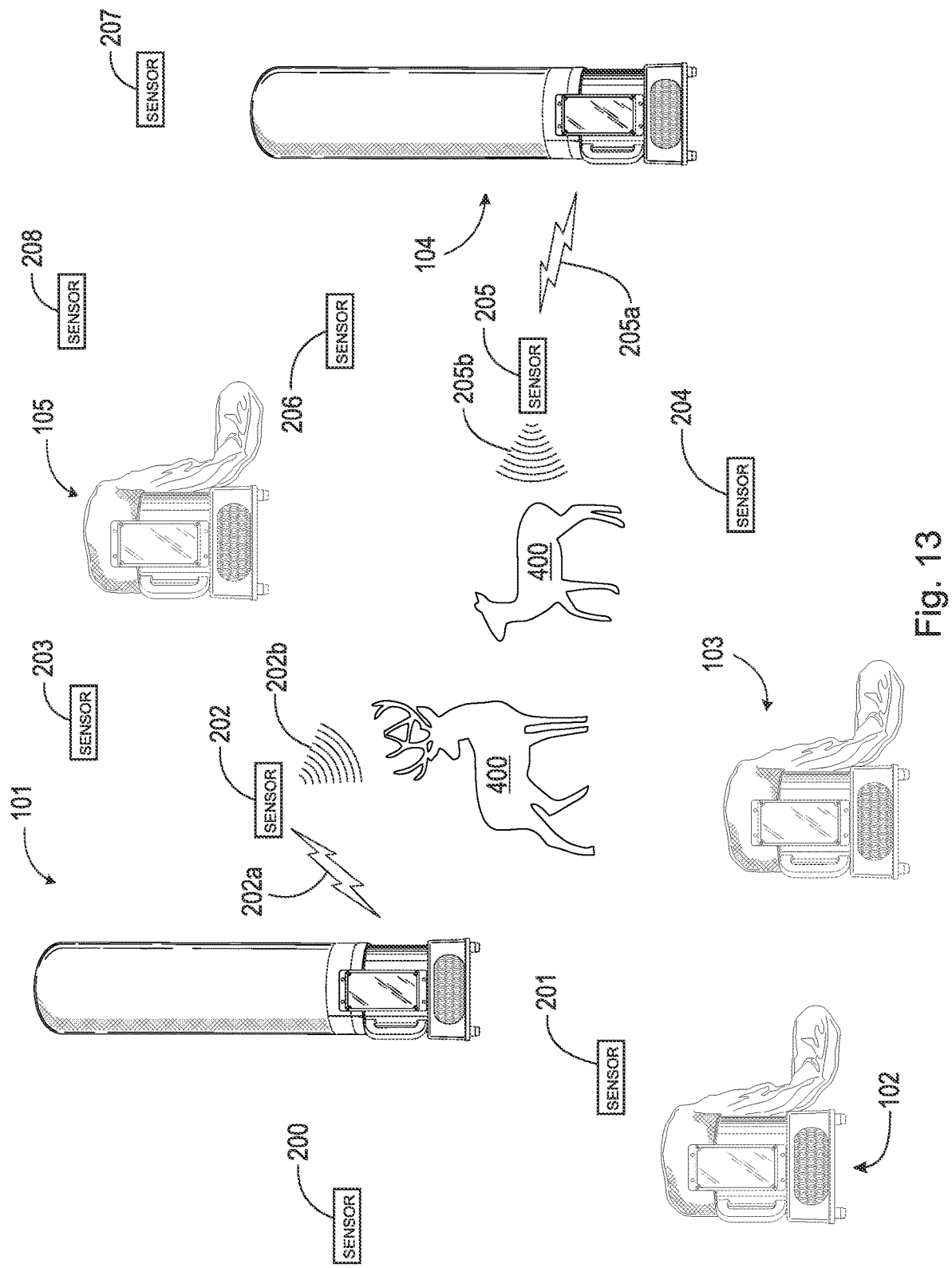

FIG. 13 illustrates an overview of multiple inflation devices shown in FIGS. 1-3, and their corresponding sensors, preferably arranged in a wildlife mitigation scenario. Specifically, inflatable apparatuses 101, 102, 103, 104, and 105 are shown spaced apart, in any distance that would be acceptable to provide a wider range of protection within the area of desire. In a preferred embodiment, inflatable apparatuses 101, 102, 103, 104, and 105 are placed in a farm field, lawn, open field, boating dock, shoreline, airports, shopping centers, etc., though FIG. 12 shows inflatable apparatuses 101, 102, 103, 104, and 105 in an outdoor setting. One having ordinary skill in the art would appreciate that although there are only five (5) inflatable apparatuses illustrated, the example of the wildlife mitigation scenario is merely exemplary, and the quantity of inflatable apparatuses is dependent on the needs of each wildlife mitigation scenario.

Inflatable apparatuses 101, 102, 103, and 104 are in wireless communication with a plurality of motion sensors. In the exemplary embodiment of a wildlife mitigation scenario, there are nine (9) motion sensors, motions sensors 200-208. Motion sensors 200-208 may be programmed to communicate with one inflatable apparatus, or multiple apparatuses, to trigger activation of the motor to inflate the respective inflatable member. In FIG. 13, motion, e.g., walking, running, etc., from wildlife 400 is detected from motion sensors 202 and 205. Motion sensors 202 and 205 upon detecting the motion, wirelessly transmit the confirmed detection, via wireless signals 202a and 205a to corresponding inflatable apparatuses 101 and 104, respectively. Wireless signals 202a and 205a signal an onboard microcontroller to activate the motors of inflatable apparatuses 101 and 104 to instantaneously inflate their respective inflatable members. The rapid inflation of inflatable apparatuses 101 and 104 startle wildlife, triggering evacuation from the area. Further, inflatable apparatuses 102, 103, and 105 are shown with a deflated member, as explained in FIG. 4, where inflatable apparatuses 102, 103, and 105 have not received a wireless signal from motion sensors 200, 201, 203, 204, 206, 207, and 206.

It should be appreciated that although FIG. 13 shows motion sensor 202 sending signal 202a to inflatable apparatus 101, that any of motion sensors 200-208 may be configured to trigger inflatable apparatuses 101, 102, 103, 104, and/or 105. This may be achieved by an onboard Bluetooth® transceiver equipped with motions sensors 200-208 and equipped with a microcontroller of inflatable apparatuses 101, 102, 103, 104, and 105. It should also be appreciated that Bluetooth capabilities are not an exclusive wireless communication method, and that other, proximity-based wireless protocols could be used, e.g., RFID, radio, Bluetooth®, or similar communication protocol. By having two, or more motion sensors paired to a single inflatable apparatus, false-positive motion indications from motion sensors can be absolved by requiring more than a single motion sensor to trigger the motor of an inflatable apparatus.

Thus, it is seen that the objects of the invention are efficiently obtained, although modifications and changes to the invention may be readily imagined by those having ordinary skill in the art, and these changes and modifications are intended to be within the scope of the claims.

REFERENCE NUMERALS

10 Base
10a-10d Foot of base 10
11 Internal cavity of base 10 and case 12
13 Inflatable member anchor
12 Case of base 10
14 Inflatable member mount
15 Internal cavity of inflatable member mount 14
16 Handle
20 Inflatable member
$20_x$ Inflated inflatable member
$20_y$ Partially-inflated inflatable member/Punctured inflatable member
$20_z$ Deflated inflatable member
22 Attachment means of inflatable member 20
22 Outer layer of inflatable member 20
23 Inner layer of inflatable member 20
30 Exhaust ports of case 12
30a-30d Side exhaust ports of case 12
30e Bottom exhaust port of case 12
40 Control Box
42 Control box mount
42a First control box mount standoff
42b Second control box mount standoff
44 Power input
50 Portable power device
52 Power output of portable power device 50
60 Motor
60a Mounting aperture of motor 60
60b Mounting aperture of motor 60
61a Mounting screw
61b Mounting screw
62 Mounting plate of motor 60
63a Motor mounting aperture of mounting plate 62
63b Motor mounting aperture of mounting plate 62
64a Mounting aperture of mounting plate 62
64b Mounting aperture of mounting plate 62
65 Motor shaft of motor 60
66 Adaptor screw
67 Receiver
68 Washer
69 Nose cone
70 Main mount
71a L-bracket of main mount 70
71b L-bracket of main mount 70
72a Stand-off of main mount 70
72b Stand-off of main mount 70
73a L-bracket screw
73b L-bracket screw
74a L-bracket bolt
74b L-bracket bolt
75a L-bracket mounting aperture of 70
75b L-bracket mounting aperture of 70
76a Mounting aperture of L-bracket 74a
76b Mounting aperture of L-bracket 74b
77a Motor mount screw
77b Motor mount screw
78a Mounting aperture of 70
78b Mounting aperture of 70
79a Bolt of 77a
79b Bolt of 77b
80 Propeller
81 Blade of Propeller 80

100, 101, . . . Inflatable apparatus
200, 201, . . . Motion sensors
200a, 201a, . . . Signal of motion sensors 200, 201, . . .
210, 211, . . . Sensors of motion sensor 200, 201, . . .
300 Trainee
400, 401, . . . Wildlife
500 Controller circuit
600 First sub-circuit
700 Second sub-circuit
800 Third sub-circuit
$C_1$, $C_2$ Capacitor
$P_{GND}$ Ground
$P_{SGND}$ Signal ground
$P_{+5}$ vDC
$P_S$
$P_{ON}$
$R_1$-$R_6$ Resistor
$T_1$-$T_3$ Transistor
$U_{555}$ 555 Timer

What is claimed is:

1. An inflation device comprising:
   a base comprising a control device, said base having a top surface containing an aperture, said control device comprising a receiver;
   a motor having a shaft mounted within said base, said motor controlled by said control device, said motor arranged to rotate at a speed of at least 8200 RPM;
   an inflation member fixedly secured to said base, circumscribing said aperture, and arranged for inflation;
   a propeller fixedly secured to said motor shaft and arranged to produce an upward thrust to inflate said inflation member;
   at least one wireless motion sensor in communication with said receiver arranged to detect motion and transmit a signal to said receiver initiate inflation of said inflation member; and,
   a random time generator in communication with said control device, said random time generator programmed to activate when movement is detected by said wireless motion sensors, wherein said random time generator generates a time delay from the detection of movement by said motion sensors to initiate inflation of said inflation member, and/or wherein said random number generator controls the time said inflation member remains inflated, and/or wherein said random number generator controls the reactivation of inflation of the inflation member after the initial trigger of the motion sensors.

2. The inflation device recited in claim 1, wherein said control device and said motor are powered by a rechargeable wireless battery.

3. The inflation device recited in claim 1, wherein said inflation member is closed ended to prevent air from escaping to allow maximum airflow volume.

4. The inflation device recited in claim 1, wherein said inflation member further comprises a double layer of ripstop nylon.

5. The inflation device recited in claim 4, wherein said double layer of ripstop nylon further comprises a high contrast orange inner lining and a different color outer lining.

6. The inflation device recited in claim 1, wherein said inflation member is open ended to allow air to escape to prevent maximum airflow volume.

7. The inflation device recited in claim 1, wherein said plurality of wireless motion sensors are programmed to communicate with said control device via radio frequency (RF) signals and said plurality of motion sensors operate under the same said radio frequency.

8. The inflation device recited in claim 7, wherein said plurality of wireless motion sensors are programmed to communicate with several of said inflation devices.

9. The inflation device recited in claim 1, wherein said plurality of wireless motion sensors have a range of motion of at least 25 feet.

10. The inflation device recited in claim 1, wherein said plurality of wireless motion sensors can detect movement from humans.

11. The inflation device recited in claim 1, wherein said plurality of wireless motion sensors can detect movement from wildlife.

12. The inflation device recited in claim 1, wherein said time delay of inflation of said inflation member by said random time generator is in the range of immediate inflation to an infinite delay of inflation.

13. The inflation device recited in claim 1, wherein said random time generator controls randomly initiated inflation one said control device of said base is triggered by said plurality of wireless motion sensors.

14. The inflation device recited in claim 1, wherein said random time generator can inflate said inflation member for a random periods of time.

15. The inflation device recited in claim 1, further comprising a random noise generator in communication with said control device, said random noise generator programmed to activate when movement is detected by said wireless motion sensors, wherein said random noise generator produces a pre-recorded sound as said inflation member inflates.

16. A method for using an inflation device in a tactical training setting, the inflation device comprising:
   a base comprising a control device, said base having a top surface containing an aperture, said control device comprising a receiver;
   a motor having a shaft mounted within said base, said motor controlled by said control device, said motor arranged to rotate at a speed of at least 8200 RPM;
   an inflation member fixedly secured to said base, circumscribing said aperture, and arranged for inflation;
   a propeller fixedly secured to said motor shaft and arranged to produce an upward thrust to inflate said inflation member;
   at least one wireless motion sensor in communication with said receiver arranged to detect motion and transmit a signal to said receiver initiate inflation of said inflation member; and
   a random time generator in communication with said control device, said random time generator programmed to activate when movement is detected by said wireless motion sensors, wherein said random time generator generates a time delay from the detection of movement by said motion sensors to initiate inflation of said inflation member, and/or wherein said random number generator controls the time said inflation member remains inflated, and/or wherein said random number generator controls the reactivation of inflation of the inflation member after the initial trigger of the motion sensors, wherein several of said inflation devices are placed in random areas of a tactical training course and a user walks through the course for the purpose of training, the method comprising the steps of:

(a) detecting movement of user moving through the training course by a set of said plurality of motion sensors;
(b) transmitting radio frequency (RF) signals from said plurality of motion sensors to said receiver of said control devices operating under the same frequency as the first set of plurality of motion sensors;
(c) activating said motor, said propeller, said random time generator, and said random noise generator of said inflation device;
(d) inflating of said inflation member of any one or all of said inflation devices activated;
(e) user detecting the inflating inflation member;
(f) user shooting at the inflating inflation member;
(g) repeating of steps a-f as user continues moving through the training course to the end of the course.

17. The method recited in claim 16, wherein said random noise generator does at least one or all of the following:
activating the inflation of the inflation member immediately, at a random time delay, or an infinite delay;
controlling the time the inflation member remains inflated; and
reactivating the inflation member at random time points at any point after initial activation.

18. An inflation device comprising:
a base comprising a control device, said base having a top surface containing an aperture, said control device comprising a receiver;
a motor having a shaft mounted within said base, said motor controlled by said control device, said motor arranged to rotate at a speed of at least 8200 RPM;
an inflation member fixedly secured to said base, circumscribing said aperture, and arranged for inflation;
a propeller fixedly secured to said motor shaft and arranged to produce an upward thrust to inflate said inflation member;
at least one wireless motion sensor in communication with said receiver arranged to detect motion and transmit a signal to said receiver initiate inflation of said inflation member;
a short-range wireless transceiver arranged to communicate with said at least one wireless motion sensor;
a random time generator in communication with said control device, said random time generator programmed to activate when movement is detected by said wireless motion sensors, wherein said random time generator generates a time delay from the detection of movement by said motion sensors to initiate inflation of said inflation member, and/or wherein said random number generator controls the time said inflation member remains inflated, and/or wherein said random number generator controls the reactivation of inflation of the inflation member after the initial trigger of the motion sensors; and,
at least one additional inflation device, said at least one additional inflation device arranged to communicate via said short-range wireless transceiver with said inflation device.

* * * * *